US011323894B2

(12) United States Patent
Dan et al.

(10) Patent No.: US 11,323,894 B2
(45) Date of Patent: May 3, 2022

(54) NETWORK SYSTEM, WIRELESS NETWORK EXTENDER, AND NETWORK PROVIDER

(71) Applicant: ASUSTeK COMPUTER INC., Taipei (TW)

(72) Inventors: Ten-Long Dan, Taipei (TW); Chang-Yi Shen, Taipei (TW); Wei-Sheng Teng, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 151 days.

(21) Appl. No.: 16/679,497

(22) Filed: Nov. 11, 2019

(65) Prior Publication Data

US 2020/0162945 A1 May 21, 2020

(30) Foreign Application Priority Data

Nov. 19, 2018 (CN) .......................... 201811375418.5

(51) Int. Cl.
*H04L 12/28* (2006.01)
*H04W 24/04* (2009.01)
*H04W 84/18* (2009.01)

(52) U.S. Cl.
CPC ............ *H04W 24/04* (2013.01); *H04W 84/18* (2013.01)

(58) Field of Classification Search
CPC ..................................................... H04L 12/50
USPC ....................................................... 370/329
See application file for complete search history.

(56) References Cited

U.S. PATENT DOCUMENTS

2013/0294356 A1* 11/2013 Bala .................. H04W 72/0453
370/329
2017/0178630 A1* 6/2017 Gummadi .............. H04M 11/10

FOREIGN PATENT DOCUMENTS

CN          105813099 A     7/2016
WO          2007076409 A2   7/2007

* cited by examiner

*Primary Examiner* — Dang T Ton
(74) *Attorney, Agent, or Firm* — McClure, Qualey & Rodack, LLP

(57) ABSTRACT

The disclosure discloses a network system, a wireless network extender, and a network provider. The network system includes a network provider, a wireless network router, and a wireless network extender. The wireless network extender includes a communication unit and an extension unit. The wireless network extender connects to the wireless network router through a first communication channel provided by the communication unit and communicates with the network provider through the wireless network router, or communicates with the network provider through a second communication channel provided by the extension unit. When the first communication channel is unavailable, the wireless network extender connects to the network provider through the second communication channel. The first communication channel and the second communication channel use different communication protocols. The disclosure can provide a mesh network with a redundancy mechanism for diagnosis/management using different communication protocols.

10 Claims, 4 Drawing Sheets

```
┌─────────────────────────────────────────────┐
│ The wireless network extender 120 connects  │
│ to the wireless network router 110 through  │──── S401
│ the first communication channel CH1 to      │
│ communicate with the network provider 10.   │
└─────────────────────────────────────────────┘
                      │
                      ▼
┌─────────────────────────────────────────────┐
│ When the first communication channel is     │
│ unavailable (that is, the wireless network  │
│ router 110 and the wireless network         │
│ extender 120 fail to connect to each other  │
│ through the first communication channel),   │──── S402
│ the wireless network extender 120 connects  │
│ to the network provider 10 through the      │
│ second communication channel CH3, and the   │
│ network provider 10 performs the diagnosis  │
│ and repair procedure on the wireless        │
│ network extender 120 through the second     │
│ communication channel CH3. The first        │
│ communication channel CH1 and the second    │
│ communication channel CH3 use different     │
│ communication protocols.                    │
└─────────────────────────────────────────────┘
                      │
                      ▼
┌─────────────────────────────────────────────┐
│ When the wireless network extender 120 is   │
│ repaired, the network provider 10 performs  │
│ the diagnosis and repair procedure on the   │──── S403
│ wireless network extender 120 through the   │
│ first communication channel CH1.            │
└─────────────────────────────────────────────┘
```

NETWORK SYSTEM, WIRELESS NETWORK EXTENDER, AND NETWORK PROVIDER

CROSS-REFERENCE TO RELATED APPLICATION

This application claims the priority benefit of Chinese Application Serial No. 201811375418.5, filed on Nov. 19, 2018. The entirety of the above-mentioned patent application is hereby incorporated by reference herein and made a part of the specification.

BACKGROUND OF THE INVENTION

Field of the Invention

The disclosure relates to a network system, a wireless network extender and a network provider, and more particularly, to a network system, a wireless network extender, and a network provider applied to a wireless mesh network.

Description of the Related Art

In current wireless mesh network architecture, when the wireless network extender and the wireless network router are disconnected, a temporary or permanent "diagnostic unavailable" state occurs. In this case, engineers need to be dispatched to carry out on-site diagnosis or repair, which requires much manpower and a long recovery time.

BRIEF SUMMARY OF THE INVENTION

The disclosure provides a network system, a wireless network extender, and a network provider, which can provide a mesh network with a redundancy mechanism for diagnosis/management using different communication protocols.

According to the first aspect of the disclosure, a network system is provided. The network system includes: a network provider; a wireless network router; and a wireless network extender, including a communication unit and a first extension unit, where the wireless network extender connects to the wireless network router through a first communication channel provided by the first communication unit and communicates with the network provider through the wireless network router, or communicates with the network provider through a second communication channel provided by the first extension unit; and where when the first communication channel is unavailable, the wireless network extender connects to the network provider through the second communication channel provided by the first extension unit, and the first communication channel and the second communication channel use different communication protocols.

According to the second aspect of the disclosure, a wireless network extender is provided. The wireless network extender applied to a network system includes: a communication unit, configured to provide a first communication channel; and a first extension unit, configured to provide a second communication channel; where the wireless network extender connects to the wireless network router through the first communication channel and communicates with the network provider through the wireless network router; when the first communication channel is unavailable, the wireless network extender connects to the network provider through the second communication channel; and the first communication channel and the second communication channel use different communication protocols.

According to the third aspect of the disclosure, a network provider is provided. The network provider applied to a network system includes: an auto configuration server, where the auto configuration server connects to the wireless network extender by the wireless network router using a first communication channel, where when the first communication channel is unavailable, the auto configuration server connects to the wireless network extender through a second communication channel, and the first communication channel and the second communication channel use different communication protocols.

In the disclosure, the wireless network extender and the wireless network router form a mesh network. The wireless network extender or the wireless network router connects to the network provider through the first communication channel or the second communication channel. When the first communication channel is unavailable, the network provider manages or diagnoses the wireless network extender through the second communication channel. That is, the disclosure provides the mesh network with a redundancy mechanism for diagnosis/management using different communication protocols.

BRIEF DESCRIPTION OF THE DRAWINGS

FIG. 4 is a flowchart of a network management method according to some embodiments of the disclosure.

DETAILED DESCRIPTION OF THE EMBODIMENTS

As used herein, the terms such as "first" and "second" and the like do not particularly refer to an order or sequence, and are not intended to limit the disclosure, but are merely used for the purpose of distinguishing elements or operations that are described in the same technical language.

As used herein, "coupled", "communicate", or "connected" may mean that two or more components or devices are in direct or indirect physical contact with each other, and may also mean that two or more components or devices cooperate or interact with each other.

In some embodiments of the disclosure, "communication channel" may refer to a wired or wireless transmission channel established between devices according to a communication protocol.

Figure 1:
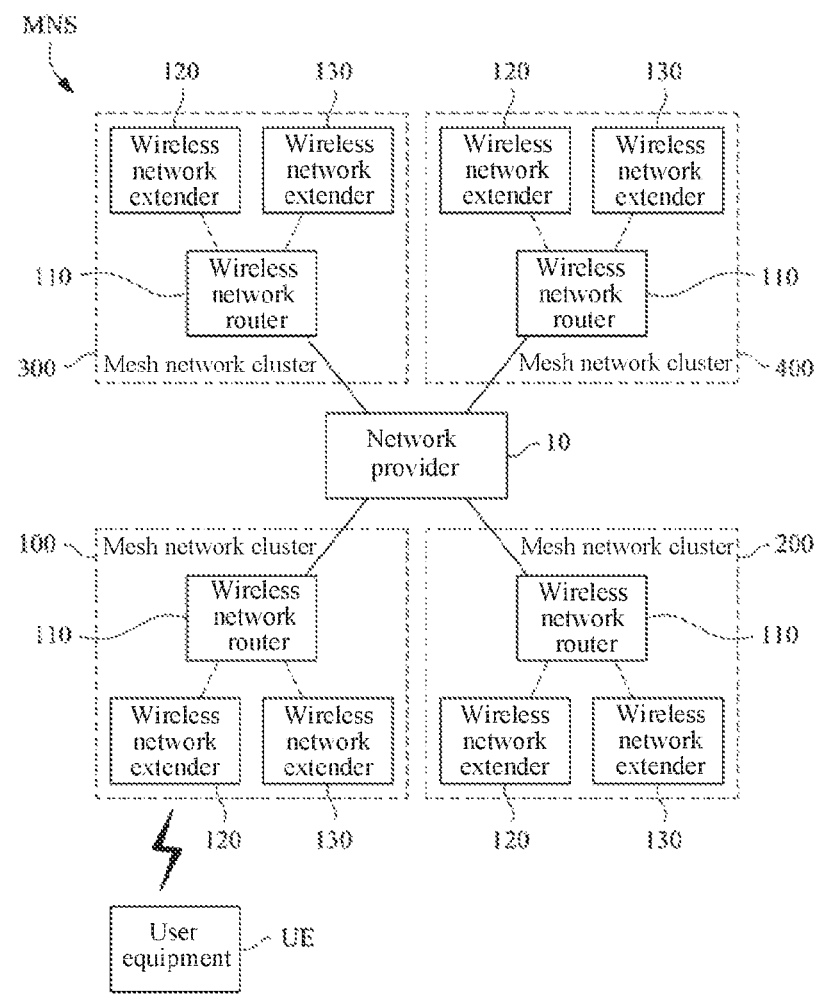
FIG. 1 is a schematic diagram showing a relationship between a network provider and a mesh network cluster according to some embodiments of the disclosure.

Refer to FIG. 1. The center of a mesh network system (MNS) is a network provider 10. In some embodiments, the network provider 10 is a server belonging to a network service provider (for example, Chunghwa Telecom), and the network provider 10 is configured to provide Internet services to a plurality of relay terminals.

As shown in FIG. 1, the network provider 10 connects to mesh network clusters 100, 200, 300, 400. In an embodiment, a wireless network router 110 in the mesh network cluster 100 connects to and exchanges information with the network provider 10 through a physical wire. In other embodiments, the mesh network cluster 200 connects to and exchanges information with the network provider 10 wirelessly. In an embodiment, the mesh network clusters 300, 400 also connect to the network provider 10 by a physical wire or wireless transmission. The details will not be repeated herein.

As shown in FIG. 1, the mesh network cluster 100 includes the wireless network router 110 and wireless network extenders 120, 130. Similarly, the mesh network clusters 200, 300, 400 are each formed by the same components as those in the mesh network cluster 100. The details will not be repeated herein.

Figure 2:
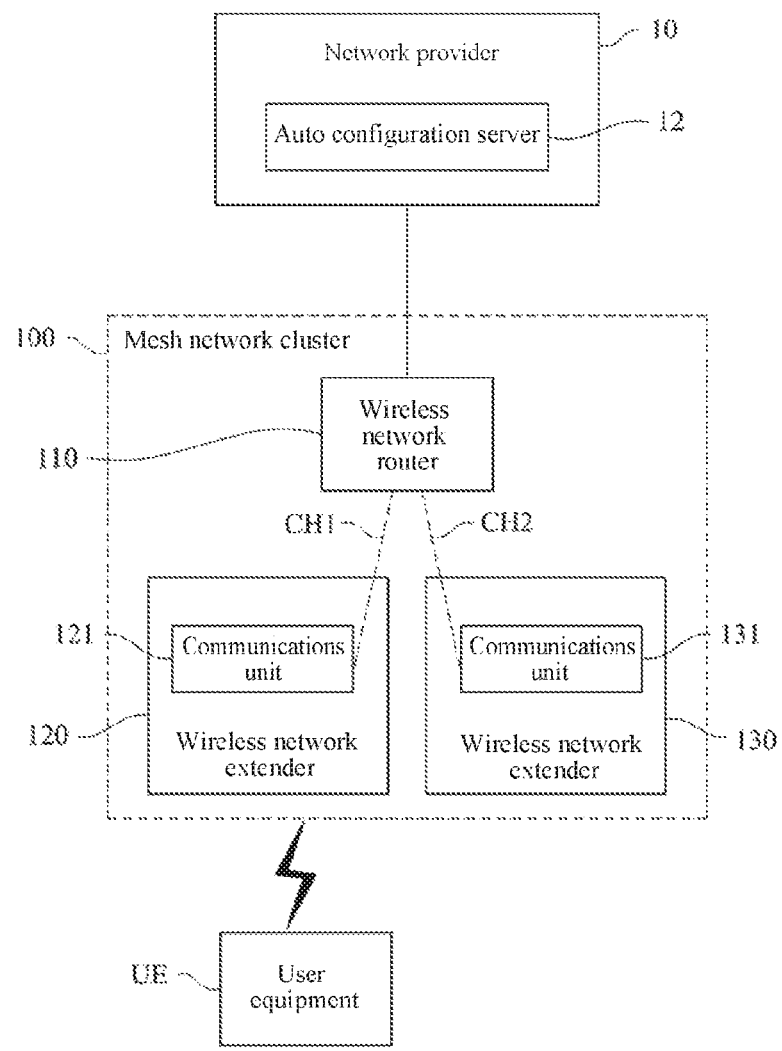
FIG. 2 is a schematic diagram of a mesh system according to an embodiment of the disclosure.

To better understand the configuration of the mesh network cluster 100, please refer to FIG. 2, which is a schematic diagram of the mesh network cluster 100 according to some embodiments of the disclosure. In this embodiment, the mesh network cluster 100 in FIG. 1 is illustrated in detail in FIG. 2.

In an embodiment, the wireless network router 110 connects to the network provider 10 through an initial communication channel (for example, the wireless network router 110 connects to the network provider 10 through a physical wire). In addition, the wireless network router 110 is the main node in the mesh network cluster 100. In an embodiment, the devices located within the signal coverage of the wireless network router 110 retrieve network services provided by the network provider 10 by connecting to the wireless network router 110. In some embodiments, the wireless network router 110 has components and/or circuits such as an antenna, a microprocessor, a memory, or a system-on-chip, and has related control software or firmware installed therein, thus providing functions such as signal transmitting and receiving, format conversion, troubleshooting, or reconfiguration.

As shown in FIG. 2, the wireless network extender 120 includes a communication unit 121, and the communication unit 121 provides a first communication channel CH1, the wireless network extender 120 connects to the wireless network router 110 through the first communication channel CH1. The first communication channel CH1 is established according to a Wi-Fi communication protocol. Therefore, the wireless network extender 120 accesses a fixed network service provided by the network provider 10 to become a wireless access point for other devices to access the network service provided by the network provider 10. Similarly, since the wireless network extender 130 includes a communication unit 131 providing a first communication channel CH2, the wireless network extender 130 connects to the wireless network router 110 through the first communication channel CH2. The first communication channel CH2 is also established according to the Wi-Fi communication protocol. Therefore, the wireless network extender 130 also becomes a wireless access point. In some embodiments, the wireless network extender 120 and the wireless network extender 130 include components and/or circuits such as an antenna, a microprocessor, a memory, or a system-on-chip, and have related control software or firmware installed therein, thus providing functions such as signal transmitting and receiving, format conversion, troubleshooting, or reconfiguration.

As shown in FIG. 2, a user equipment UE is located within the signal coverage of the wireless network extender 120. In an embodiment, the user equipment UE connects to the wireless network extender 120 through the communication unit 121 to access the network service provided by the network provider 10. In addition, even another user equipment comes out within the signal coverage of the wireless network extender 120, the user equipment UE is also able to connect to the wireless network extender 120 to access the network service. In some embodiments, the user equipment UE is a smartphone, a tablet computer, a notebook computer, or another common electronic device having a network connection function.

As shown in FIG. 2, the mesh network cluster 100 includes the wireless network router 110 and the wireless network extenders 120, 130. The wireless network router 110 is the main node and connected to the network provider 10 by a physical wire to provide a network service. The wireless network extenders 120, 130 are relay nodes and connected to the wireless network router 110 to extend the coverage of the network service. The user equipment UE is a terminal node and connected to the relay node in the mesh network cluster 100 to access the network service.

As shown in FIG. 2, the mesh network cluster 100 has a layered architecture, and once the wireless network extenders 120, 130 fail to connect to the wireless network router 110 (that is, the first communication channels CH1, CH2 provided by the communication units 121, 131 are unavailable), or the physical-wire communication between the wireless network router 110 and the network provider 10 is interrupted, the user equipment UE cannot access the network service. Generally, as shown in FIG. 2, the network provider 10 has an auto configuration server 12 configured to collect information from the mesh network cluster 100 through an intranet. When the connection is faulty or the communication is interrupted, the auto configuration server 12 attempts to perform a diagnosis and repair procedure such as failover diagnosis and repair procedure (for example, TR069) on at least one of the main node (that is, the wireless network router) or the relay node (that is, the wireless network extender) in the mesh network cluster 100. In an embodiment, the failover diagnosis and repair procedure of the auto configuration server 12 includes TCP/IP protocol diagnosis and repair or Universal Plug and Play (UPnP) protocol diagnosis and repair. If the auto configuration server 12 successfully diagnoses the cause of the problem, the auto configuration server 12 further attempts to repair (or reconfigure) at least one of the wireless network router 110 or the wireless network extenders 120, 130, to recover the communication.

Figure 3:
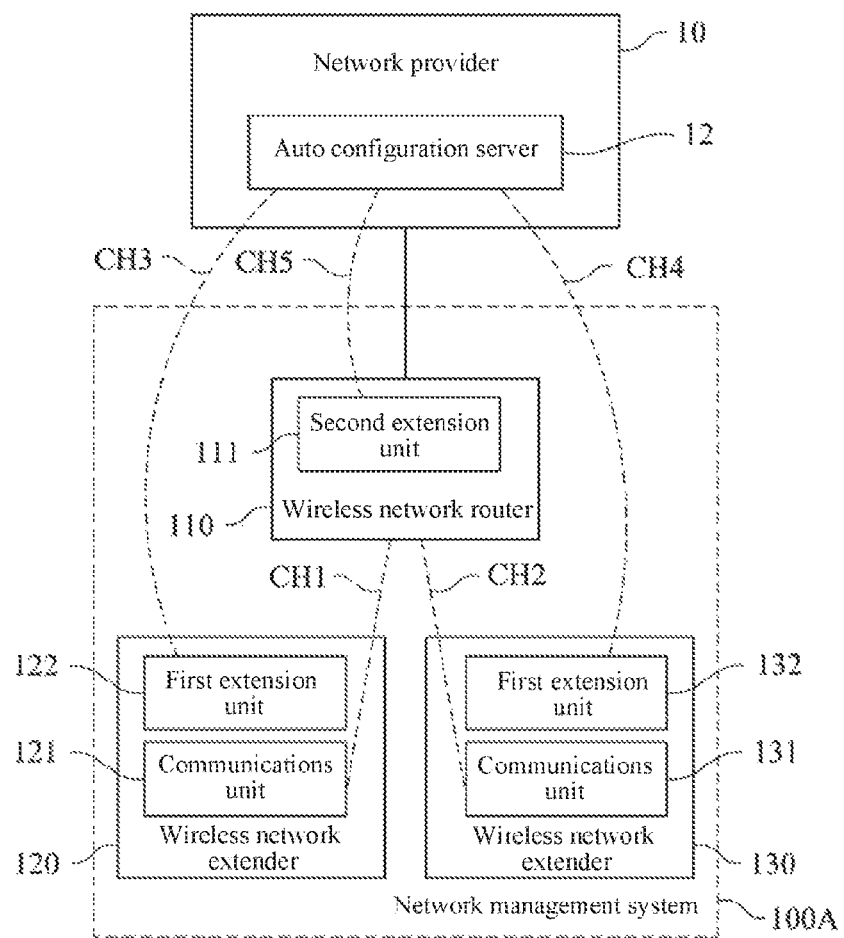
FIG. 3 is a schematic diagram of a mesh system according to another embodiment of the disclosure.

FIG. 3 is a schematic diagram of a network management system 100A according to some embodiments of the disclosure. It should be understood that some components of the network management system 100A in FIG. 3 are same as those of the mesh network cluster 100 in FIG. 2. Therefore, refer to FIG. 2 for a better understanding of the network management system 100A in FIG. 3.

As shown in FIG. 3, in some embodiments, the network management system 100A includes the wireless network router 110 and the wireless network extenders 120, 130 in FIG. 2. The wireless network router 110 is the main node, which connects to the network provider 10 to access the fixed network service. The wireless network extenders 120, 130 are relay nodes connected to the wireless network router 110 through the first communication channels CH1, CH2 provided by the communication units 121, 131, respectively, thereby extending the coverage of the network service. The user equipment UE is a user terminal which connects to the wireless network extender 120 to access the network service provided by the network provider 10.

In some embodiments, as shown in FIG. 3, the wireless network extender 120 further includes a first extension unit 122 and the wireless network extender 130 further includes a first extension unit 132. The first extension unit 122 provides a second communication channel CH3 for the wireless network extender 120 and the first extension unit 132 provides a second communication channel CH4 for the wireless network extender 130. The second communication channels CH3, CH4 are different from the first communication channels CH1, CH2. Therefore, the wireless network extender 120 communicates with the network provider 10 through the second communication channel CH3 and the wireless network extender 130 communicates with the network provider 10 through the second communication channel CH4. It should be noted that in some embodiments, the second communication channels CH3, CH4 provided by the first extension unit 122 and the first extension unit 132 are established through at least one of the following communication protocols: Global System for Mobile Communications (GSM), Code Division Multiple Access (CDMA), Frequency Division Multiple Access (FDMA), Time Division Multiple Access (TDMA), Personal Digital Cellular (PDC), Total Access Communication System (TACS), Advanced Mobile Phone System (AMPS), Long Term Evolution (LTE), 3rd-Generation (3G), 4th-Generation (4G), 5th-Generation (5G), Long Range (LoRa), Narrow Band Internet of Things (NBIoT), and/or Bluetooth Low Energy (BLE).

The above communication protocols used by the first extension unit 122 and the first extension unit 132 are examples only, and the disclosure is not limited to the above types of communication protocols or technologies. In some embodiments, the second communication channels CH3, CH4 provided by the first extension units 122, 132 use different communication protocols.

It should be understood that the first extension units 122, 132 are implemented through a hardware device, a firmware program or a software program. In an embodiment, the first extension units 122, 132 are USB dongle devices and respectively disposed on the wireless network extenders 120, 130, and the microprocessors of the wireless network extenders 120, 130 are respectively connected to the USB dongle devices to implement the above functions. In an embodiment, the first extension units 122, 132 are embedded Subscriber Identity Module (SIM) cards and respectively disposed on the wireless network extenders 120, 130, and the microprocessors of the wireless network extenders 120, 130 access the embedded SIM card to implement the above functions. In an embodiment, the first extension units 122, 132 are firmware programs or software programs and respectively installed in memories of the wireless network extenders 120, 130, and the microprocessors of the wireless network extenders 120, 130 access and execute the firmware programs or the software programs from the memories to utilize the communication modules of the wireless network extenders 120, 130 to implement the above functions. Alternatively, each of the first extension units 122, 132 is implemented by one or more transceiver circuits and/or repeater circuits to perform communication operations specified by the corresponding communication protocols. It should be understood that the above embodiments can also be used in combination in different applications.

In an embodiment, when an architecture similar to the mesh network cluster 100 in FIG. 1 and FIG. 2 is established, the wireless network router 110 connects to the wireless network extenders 120, 130 respectively only through the first communication channels CH1, CH2 established based on a single communication protocol (for example, Wi-Fi communication protocol implemented by the communication units 121, 131). In these technologies, when the communication units 121, 131 of the wireless network extenders 120, 130 fail in connecting to the wireless network router 110 (that is, when the first communication channel between the relay node and the main node is unavailable), the mesh network cluster 100 is in a temporary or permanent "diagnostic unavailable" state. In these states, the auto configuration server (ACS) in the network provider 10 cannot perform the above diagnosis and repair procedure to control the relay node.

In an embodiment, the network management system 100A in FIG. 3 is an integration between the mesh network cluster 100 in FIG. 2 and a cellular network employing another communication protocol. In the network management system 100A, when the first communication channel CH1 provided by the communication unit 121 is in a normal state, the wireless network extender 120 communicates with the network provider 10 through the first communication channel CH1 based on the Wi-Fi protocol (through the wireless network router 110). In some embodiments, when the first communication channel CH1 is unavailable, the wireless network extender 120 communicates with the network provider 10 through the second communication channel CH3 that is based on the other communication protocol. In this way, the auto configuration server 12 in the network provider 10 performs diagnosis, management, reconfiguration, repair or other operations on the wireless network extender 120 through the second communication channel CH3. Similarly, since the wireless network extender 130 has the first extension unit 132, the auto configuration server 12 diagnoses, manages, or repairs the wireless network extender 130 through the second communication channel CH4 when the first communication channel CH2 is unavailable. In other words, the auto configuration server 12 performs online Over-the-Air Technology (OTA) diagnosis or repair on the wireless network extenders 120, 130 through the communication channels of the extension units 122, 132. In addition, the communication protocols of the communication channels of the extension units 122, 132 are different from that of the communication channels of the communication units 121, 131.

In some embodiments, when the auto configuration server 12 successfully repairs or reconfigures the wireless network extenders 120, 130 through the second communication channels CH3, CH4, the wireless network extenders 120, 130 recover to communicate with the network provider 10 through the first communication channels CH1, CH2. In this case, when the connection of the wireless network extenders 120, 130 is failed, the auto configuration server 12 repairs the connection of the wireless network extenders 120, 130 through the first communication channels CH1, CH2. However, when the auto configuration server 12 cannot repair the connection of the wireless network extenders 120, 130 through the first communication channels CH1, CH2, the auto configuration server 12 diagnoses the wireless network extenders through the second communication channels CH3, CH4.

In some embodiments, network service operators of the network provider 10 provide different charging schemes for such an integrated mesh network service. In an embodiment, a network service provided by the first communication channels CH1, CH2 based on a first Wi-Fi protocol (that is, the architecture of the mesh network cluster 100 shown in the embodiment of FIG. 2) is charged according to a first scheme. An additional network service provided by the second communication channels CH3, CH4 based on a Wi-Fi protocol (that is, a second Wi-Fi protocol) different from that of the first communication channels CH1, CH2 (that is, the architecture of the network management system 100A shown in the embodiment of FIG. 3) is charged according to a second scheme. In this embodiment, the second scheme is a backup mechanism for the first scheme.

Users can select whether to pay for the backup mechanism, to diagnose or repair the mesh network in the "diagnostic unavailable" state, so as to improve the efficiency of network repair.

Refer to FIG. 3. In an embodiment, the wireless network router 110 also includes a second extension unit 111, which provides a third communication channel CH5 that is based on a communication protocol different from that of the initial communication channel (for example, a physical wire between the wireless network router 110 and the network provider 10), so that the wireless network router 110 communicates with the network provider 10 through the third communication channel CH5. In an embodiment, the third communication channel CH5 provided by the second extension unit 111 is established based on the communication protocol of the first extension units 122, 132, and the details will not be repeated herein. Similarly, when the physical wire is in a normal state, the wireless network router 110 communicates with the network provider 10 through a physical wire. In some embodiments, when the physical wire is unable to provide connecting service (that is, the wireless network router 110 fails to connect to the network provider 10 through the physical wire), the second extension unit 111 in the network provider 10 communicates with the wireless network extender 120 through the third communication channel CH5 that is based on another communication protocol different from that of the physical wire. In this way, the auto configuration server 12 performs the diagnosis and repair procedure on the wireless network router 110 through the third communication channel CH5. When the auto configuration server 12 successfully repairs or reconfigures the wireless network router 110 through the third communication channel CH5, the wireless network router 110 recovers to communicate with the network provider 10 through the physical wire. In this way, the network provider 10 performs the diagnosis and repair procedure on the wireless network router 110 through the initial communication channel.

In some embodiments, when the initial communication channel and the third communication channel CH5 of the wireless network router 110 and the network provider 10 are both unavailable, the auto configuration server 12 of the network provider 10 communicates with the wireless network extenders 120, 130 through the second communication channels CH3, CH4, and further communicates with the wireless network router 110 through the first communication channels CH1, CH2, so as to perform the diagnosis and repair procedure on the wireless network router 110. When the wireless network router 110 is repaired or reconfigured, the wireless network router 110 recovers to communicate with the network provider 10 through the initial communication channel or the third communication channel CH5. In this way, the network provider 10 performs the diagnosis and repair procedure on the wireless network router 110 through the initial communication channel or the third communication channel CH5.

It should be understood that the various embodiments described above are examples only, and other hardware or software elements capable of implementing the same functions or operations also fall within the scope of the disclosure. In addition, it should be understood that the quantity of elements shown in the accompanying drawings is merely exemplary, and various quantities of extenders, user equipment, routers and/or network providers all fall within the scope of the disclosure.

Refer to FIG. 4. FIG. 4 is a flowchart of a network management method according to some embodiments of the disclosure. In an embodiment, the network management method is performed by the network management system 100A shown in FIG. 3. In particular, the network management method is mainly performed by the wireless network extenders 120, 130 with the first extension units 122, 132 and the wireless network router 110 with the second extension unit 111, so reference can also be made to the embodiment in FIG. 3. In this embodiment, steps included in the network management method will be detailed below.

Step S401: The wireless network extender 120 connects to the wireless network router 110 through the first communication channel CH1 to communicate with the network provider 10.

In some embodiments, the wireless network extender 120 connects to the wireless network router 110 through the first communication channel CH1 based on the wireless network protocol. When the first communication channel CH1 is in a normal state, the wireless network extender 120 communicates with the network provider 10 through the first communication channel CH1 provided by the communication unit 121. In this case, a user equipment UE comes up within the signal coverage of the wireless network extender 120 is also able to access the network service provided by the network provider 10 through the wireless network extender 120.

Step S402: When the first communication channel is unavailable (that is, the wireless network router 110 and the wireless network extender 120 fail to connect to each other through the first communication channel), the wireless network extender 120 connects to the network provider 10 through the second communication channel CH3, and the network provider 10 performs the diagnosis and repair procedure on the wireless network extender 120 through the second communication channel CH3. The first communication channel CH1 and the second communication channel CH3 use different communication protocols.

In some embodiments, when the first communication channel CH1 is unavailable, the wireless network extender 120 connects to the network provider 10 through the second communication channel CH3 provided by the first extension unit 122 disposed on the wireless network extender 120. In this way, the auto configuration server 12 in the network provider 10 performs the diagnosis and repair procedure such as diagnosis, management, or repair on the wireless network extender 120 through the second communication channel CH3. It should be understood that in some embodiments, the second communication channel CH3 is established based on the communication protocol in the embodiment of FIG. 3, and the first communication channel CH1 and the second communication channel CH3 use different communication protocols. The details will not be repeated herein.

Step S403: When the wireless network extender 120 is repaired, the network provider 10 performs the diagnosis and repair procedure on the wireless network extender 120 through the first communication channel CH1.

In some embodiments, when the auto configuration server 12 successfully repairs or reconfigures the wireless network extender 120 through the second communication channel CH3, the wireless network extender 120 recovers to communicate with the network provider 10 through the first communication channel CH1 provided by the communication unit 121 and the wireless network router 110. In this way, when the connection to the wireless network extender 120 is failed again, the auto configuration server 12 attempts to repair the connection of the wireless network extender 120 through the first communication channel CH1 first.

However, when the connection to the wireless network extender 120 is still failed, the auto configuration server 12 diagnoses the wireless network extender 120 through the second communication channel CH3 provided by the first extension unit 122.

According to the foregoing embodiments, the disclosure disclose a network management system and method, to integrate an existing wireless mesh network and cellular network that use different communication protocols, to provide a self-healing mechanism for nodes in the mesh network. In addition, according to the foregoing embodiments, for such an integrated mesh network, the network provider provides different charging schemes for users to select, creating a new business mode.

Although the disclosure is described with reference to the above embodiments, the embodiments are not intended to limit the disclosure. Any person of ordinary skill in the art may make variations and modifications without departing from the spirit and scope of the disclosure. Therefore, the protection scope of the disclosure should be subject to the appended claims.

What is claimed is:

1. A network device, comprising:
    a network provider;
    a wireless network router connected to the network provider through an initial communication channel; and
    a wireless network extender, comprising a communication unit and a first extension unit, wherein the wireless network extender connects to the wireless network router through a first communication channel provided by the first communication unit and communicates with the network provider through the wireless network router, or communicates with the network provider through a second communication channel provided by the first extension unit; and wherein
    when the first communication channel is unavailable, the wireless network extender connects to the network provider through the second communication channel provided by the first extension unit, and the first communication channel and the second communication channel use different communication protocols,
    wherein the network provider has an auto configuration server and the wireless network router further comprises a second extension unit when the initial communication channel between the wireless network router and the network provider is unavailable, the wireless network router connects to the network provider through a third communication channel provided by the second extension unit, so that the auto configuration server performs a diagnosis and repair procedure on the wireless network router through the third communication channel; and the initial communication channel and the third communication channel use different communication protocols.

2. The network system according to claim 1, wherein the first communication channel is established through a Wi-Fi technology, and the second communication channel is established through at least one of Global System for Mobile Communications, Code Division Multiple Access, Frequency Division Multiple Access, Time Division Multiple Access, Personal Digital Cellular, Total Access Communication System, Advanced Mobile Phone System, Long Term Evolution, 3rd-Generation, 4th-Generation, 5th-Generation, Long Range, Narrow Band Internet of Things, and Bluetooth Low Energy.

3. The network system according to claim 1, wherein when the first communication channel is unavailable, the auto configuration server performs the diagnosis and repair procedure on the wireless network extender through the second communication channel; and when the wireless network extender is repaired, the auto configuration server performs the diagnosis and repair procedure on the wireless network extender through the first communication channel.

4. The network system according to claim 3, wherein the diagnosis and repair procedure is a failover diagnosis and repair procedure or a load balancing diagnosis and repair procedure.

5. A wireless network extender, applied to a network system comprising a wireless network router and a network provider connected to the wireless network router through an initial communication channel, the wireless network extender comprising:
    a communication unit, configured to provide a first communication channel; and
    a first extension unit, configured to provide a second communication channel;
    wherein the wireless network extender connects to the wireless network router through the first communication channel and communicates with the network provider through the wireless network router; when the first communication channel is unavailable, the wireless network extender connects to the network provider through the second communication channel; and the first communication channel and the second communication channel use different communication protocols,
    wherein the network provider has an auto configuration server; when the first communication channel is unavailable, the auto configuration server performs a diagnosis and repair procedure on the wireless network extender through the second communication channel; and when the wireless network extender is repaired, the auto configuration server performs the diagnosis and repair procedure on the wireless network extender through the first communication channel.

6. The wireless network extender according to claim 5, wherein the diagnosis and repair procedure is a failover diagnosis and repair procedure or a load balancing diagnosis and repair procedure.

7. A network provider, applied to a network system comprising a wireless network router connected to the network provider through an initial communication channel and a wireless network extender, the network provider comprising:
    an auto configuration server, wherein the auto configuration server connects to the wireless network extender by the wireless network router using a first communication channel, wherein
    when the first communication channel is unavailable, the auto configuration server connects to the wireless network extender through a second communication channel, and the first communication channel and the second communication channel use different communication protocol,
    wherein the wireless network router further comprises a second extension unit when the initial communication channel between the wireless network router and the auto configuration server is unavailable, the wireless network router connects to the auto configuration server through a third communication channel provided by the second extension unit, so that the auto configuration server performs a diagnosis and repair procedure on the wireless network router through the third communication channel; and the initial communication channel and the third communication channel use different communication protocols.

8. The network provider according to claim 7, wherein when the first communication channel is unavailable, the auto configuration server performs the diagnosis and repair procedure on the wireless network extender through the second communication channel; and when the wireless network extender is repaired, the auto configuration server performs the diagnosis and repair procedure on the wireless network extender through the wireless network router using the first communication channel.

9. The network provider according to claim 7, wherein the wireless network extender comprises a communication unit and a first extension unit, the communication unit is configured to provide the first communication channel to connect to the wireless network extender, and the first extension unit is configured to provide the second communication channel to connect to the auto configuration server.

10. The network provider according to claim 7, wherein when both the initial communication channel and the third communication channel are unavailable, the auto configuration server connects to the wireless network extender through the second communication channel and connects to the wireless network router through the wireless network extender to perform the diagnosis and repair procedure on the wireless network router.

* * * * *